United States Patent
Page et al.

(10) Patent No.: US 11,068,069 B2
(45) Date of Patent: Jul. 20, 2021

(54) VEHICLE CONTROL WITH FACIAL AND GESTURE RECOGNITION USING A CONVOLUTIONAL NEURAL NETWORK

(71) Applicant: DUS Operating Inc., Auburn Hills, MI (US)

(72) Inventors: Indraneel Krishna Page, Farmington Hills, MI (US); Iyad Faisal Ghazi Mansour, Auburn Hills, MI (US)

(73) Assignee: DUS Operating Inc., Auburn Hills, MI (US)

(*) Notice: Subject to any disclaimer, the term of this patent is extended or adjusted under 35 U.S.C. 154(b) by 0 days.

(21) Appl. No.: 16/780,165

(22) Filed: Feb. 3, 2020

(65) Prior Publication Data

US 2020/0249764 A1 Aug. 6, 2020

Related U.S. Application Data

(60) Provisional application No. 62/800,850, filed on Feb. 4, 2019.

(51) Int. Cl.
*G06F 3/01* (2006.01)
*G06K 9/00* (2006.01)
*G06N 3/08* (2006.01)

(52) U.S. Cl.
CPC ......... *G06F 3/017* (2013.01); *G06K 9/00335* (2013.01); *G06N 3/08* (2013.01)

(58) Field of Classification Search
CPC ....... G06F 3/017; G06K 9/00335; G06N 3/08
See application file for complete search history.

(56) References Cited

U.S. PATENT DOCUMENTS

| | | | | |
|---|---|---|---|---|
| 6,400,835 B1* | 6/2002 | Lemelson | ............ | B60Q 1/0023 382/118 |
| 6,529,809 B1* | 3/2003 | Breed | ............ | G01S 15/04 180/268 |
| 9,483,695 B2* | 11/2016 | S | ............ | A61B 5/163 |
| 10,289,938 B1* | 5/2019 | Flowers | ............ | G06K 9/00845 |
| 10,322,728 B1* | 6/2019 | Porikli | ............ | G06K 9/00302 |
| 10,684,626 B1* | 6/2020 | Martin | ............ | G05D 1/0253 |
| 10,850,693 B1* | 12/2020 | Pertsel | ............ | G06K 9/00832 |
| 2008/0069403 A1* | 3/2008 | Breed | ............ | G06K 9/00832 382/104 |
| 2008/0292146 A1* | 11/2008 | Breed | ............ | B60N 2/002 382/118 |
| 2014/0200737 A1* | 7/2014 | Lortz | ............ | B60R 16/037 701/1 |
| 2014/0310594 A1* | 10/2014 | Ricci | ............ | B60N 2/0244 715/702 |
| 2015/0009010 A1* | 1/2015 | Biemer | ............ | G01G 19/44 340/5.83 |
| 2017/0336793 A1* | 11/2017 | Shashua | ............ | G01C 21/3476 |
| 2018/0012092 A1* | 1/2018 | Gleeson-May | ..... | G06K 9/00281 |
| 2018/0025243 A1* | 1/2018 | Chandraker | ....... | G06K 9/00228 382/118 |
| 2018/0053103 A1* | 2/2018 | Delgado | ............ | G06N 5/04 |
| 2018/0060648 A1* | 3/2018 | Yoo | ............ | G06N 3/04 |
| 2018/0157972 A1* | 6/2018 | Hu | ............ | G06N 3/0454 |
| 2018/0189581 A1* | 7/2018 | Turcot | ............ | G06K 9/4628 |

(Continued)

*Primary Examiner* — Tadesse Hailu
(74) *Attorney, Agent, or Firm* — Vivacqua Crane

(57) ABSTRACT

A system and method for facial and gesture recognition, and more particularly a system and method for facial and gesture recognition using a heterogeneous convolutional neural network (CNN).

16 Claims, 3 Drawing Sheets

(56) References Cited

U.S. PATENT DOCUMENTS

| | | | | |
|---|---|---|---|---|
| 2018/0330178 | A1* | 11/2018 | el Kaliouby | B60W 50/082 |
| 2019/0019068 | A1* | 1/2019 | Zhu | G06K 9/6293 |
| 2019/0143989 | A1* | 5/2019 | Oba | A61B 3/113 |
| | | | | 701/70 |
| 2019/0213429 | A1* | 7/2019 | Sicconi | G06F 3/016 |
| 2019/0279009 | A1* | 9/2019 | Srirangam Narashiman | |
| | | | | G06K 9/2018 |
| 2019/0311202 | A1* | 10/2019 | Lee | G06K 9/6256 |
| 2019/0370580 | A1* | 12/2019 | Aoi | A61B 5/163 |
| 2020/0026996 | A1* | 1/2020 | Kolter | G06F 17/17 |
| 2020/0228336 | A1* | 7/2020 | Streit | G06N 3/04 |
| 2020/0234124 | A1* | 7/2020 | Park | G06N 3/08 |
| 2020/0309930 | A1* | 10/2020 | Zhou | G01S 15/32 |
| 2020/0334477 | A1* | 10/2020 | Aoi | G06K 9/00302 |
| 2020/0364508 | A1* | 11/2020 | Gurel | G05D 1/0246 |

\* cited by examiner

VEHICLE CONTROL WITH FACIAL AND GESTURE RECOGNITION USING A CONVOLUTIONAL NEURAL NETWORK

FIELD

The present disclosure relates generally to controlling a vehicle with facial and gesture recognition, and more particularly to controlling a vehicle with facial and gesture recognition using a convolutional neural network (CNN).

BACKGROUND

The statements in this section merely provide background information related to the present disclosure and may or may not constitute prior art.

Motor vehicles include various detection technologies to automate certain vehicle controls and functions. For example, a facial recognition system may be used as biometric security for a motor vehicle. The facial recognition system identifies a person from an image of a subject face. The image is captured using machine vision, i.e., a camera or other sensor. The facial recognition system extracts multiple features of the subject face from the image, measures and maps the features relative to one another, and uses software algorithms to identify the person. In another example, a gesture recognition system may be used to implement a touchless user interface. The gesture recognition system employs one or more sensors, such as motion sensors or cameras, to monitor a user's movements. Detected movements that correspond to a command generate an output from the vehicle, such as unlocking a device, launching an application, etc. The gesture recognition system uses software algorithms, in a manner similar to facial recognition, to detect and analyze user's gestures.

While these software algorithms are useful for their intended purpose, there is a need in the art for new systems and methods that employ artificial intelligence learning systems to operate facial and gesture recognition systems without requiring cost prohibitive processing and training.

SUMMARY

A system and method for facial and gesture recognition, and more particularly system and method for facial and gesture recognition using a convolutional neural network (CNN) is provided.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
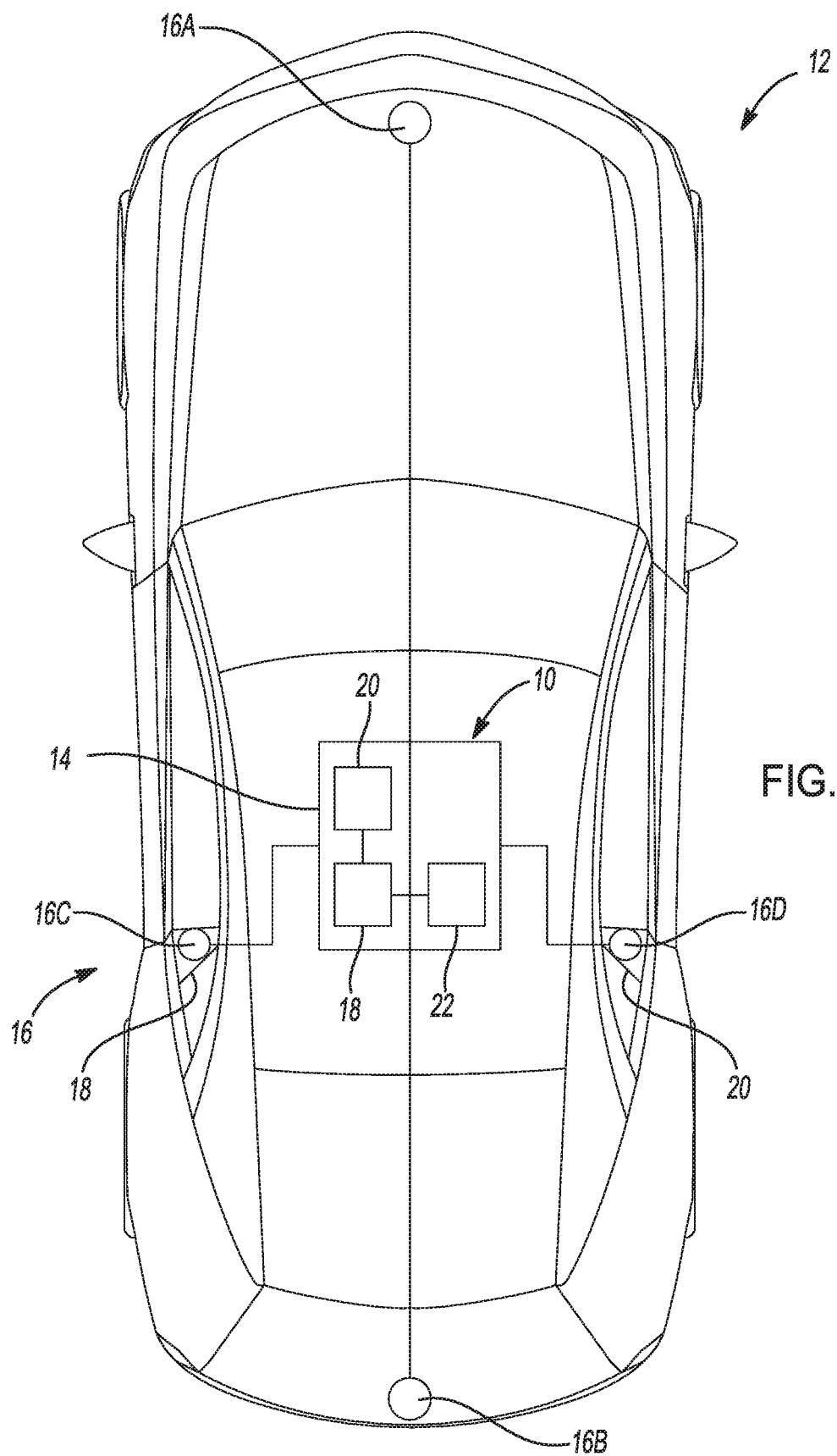
FIG. 1 is a schematic diagram of a facial and gesture recognition system used with an exemplary motor vehicle.

Referring to FIG. 1, a schematic diagram of a facial and gesture recognition system 10 according to aspects of the present disclosure is shown with an exemplary motor vehicle 12. The motor vehicle 12 is illustrated as a passenger vehicle, however, the motor vehicle 12 may be a truck, sport utility vehicle, van, motor home, or any other type of vehicle without departing from the scope of the present disclosure. The facial and gesture recognition system 10 generally includes a controller 14 and one or more sensors 16.

The controller 14 is a non-generalized, electronic control device having a preprogrammed digital computer or processor 18, memory or non-transitory computer readable medium 20 used to store data such as control logic, software applications, instructions, computer code, data, lookup tables, etc., and input/output ports 22. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. Thus, a non-transitory computer readable medium includes media where data can be permanently stored and media where data can be stored and later overwritten, such as a rewritable optical disc or an erasable memory device. Computer code includes any type of program code, including source code, object code, executable code, and a neural network. The processor 20 is configured to execute the code or instructions and the neural network. The controller 14 may be a dedicated control module or part of another control module on the motor vehicle 12, such as an advanced driver assist or autonomous driving control module, an engine control module, a body control module, etc.

The one or more sensors 16 are mounted along a periphery of the motor vehicle 12. In the example provided, the one or more sensors 16 include a front sensor 16A, a rear sensor 16B, a left sensor 16C, and a right sensor 16D. However, it should be appreciated that there may be any number of sensors 16 without departing from the scope of the disclosure. Each of the sensors 16A-D is operable to collect or sense information in a predefined area surrounding the motor vehicle 12. Information from the sensors 16A-D is communicated to the controller 20. In a preferred embodiment, the sensors 16A-D are cameras that collect images and/or video data. For example, the sensors 16A-D may be infra-red cameras, RGB cameras, dual (side-by-side) cameras, time-of-flight cameras, or log profile cameras. In one aspect, the left sensor 16C is mounted in a left trim pillar 18 of the motor vehicle 12 while the right sensor 16D is mounted in a right trim pillar 20.

Figure 2:
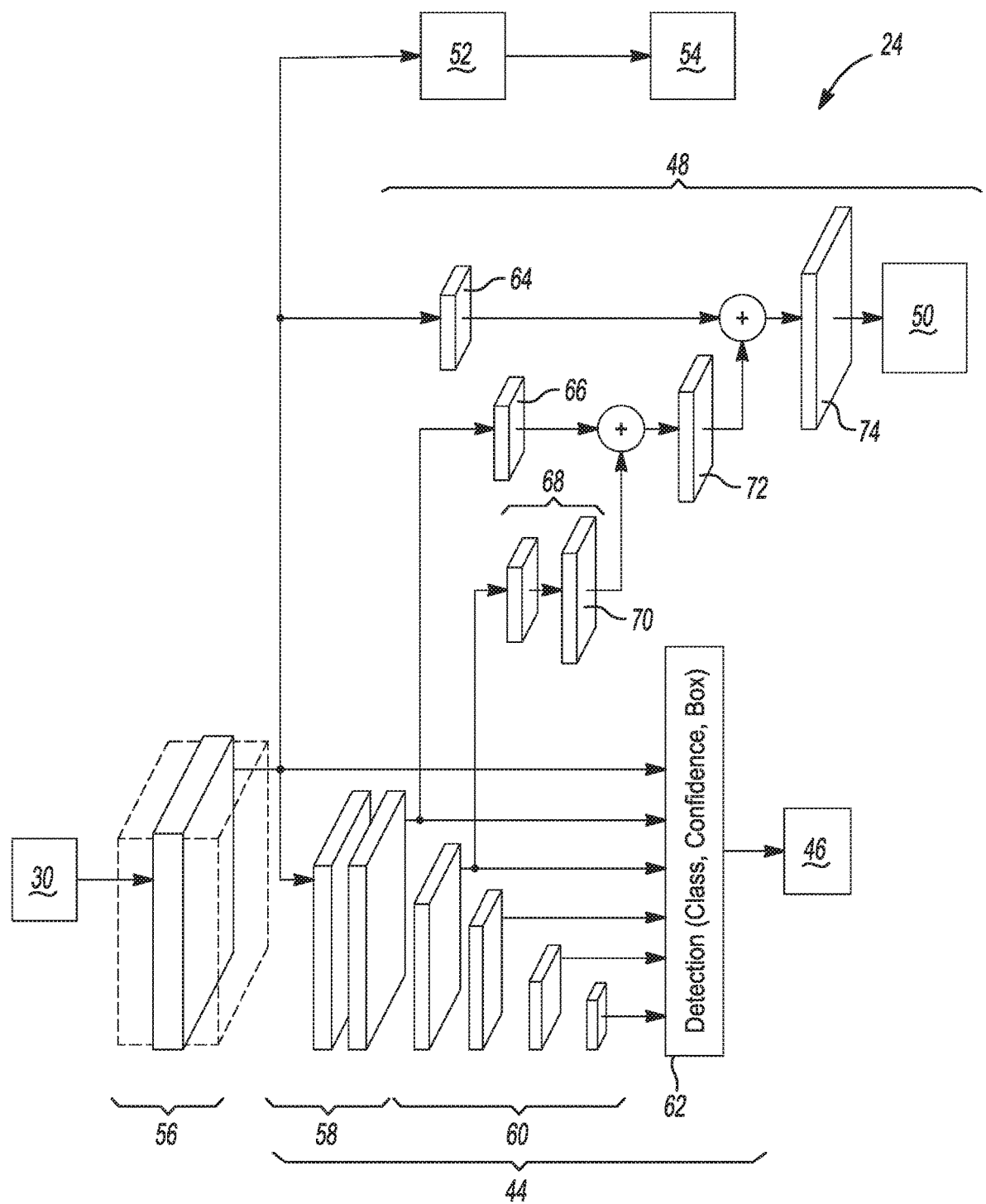
FIG. 2 is a diagrammatic presentation of the elements of a CNN of the present disclosure.

With reference to FIG. 2, a convolutional neural network (CNN) 24, specifically a heterogeneous convolutional neural network (HCNN) similar to the CNN described in applicant's U.S. provisional patent application 62/639,214 filed on Mar. 6, 2018 which is hereby incorporated by reference in its entirety, used by the facial and gesture recognition system 10 is shown in a schematic diagram. The CNN 24 is executed by the controller 14. Generally, the CNN 24 receives an input image 30 via one of the sensors 16A-D and performs several parallel tasks. In the example provided, the CNN 24 includes a first sub-network 44 that outputs a first sub-network output 46 and a second sub-network 48 that outputs a second sub-network output 50. Additional third and more sub-networks performing further tasks, up to an n sub-network 52 outputting a n sub-network output 54, where n is a whole number greater than 1, may also be provided with the CNN 24. In the example provided, the first sub-network 44 performs a first task of facial recognition while the second sub-network 48 performs a second task of gesture recognition. The first sub-network output 46 includes confidence levels associated with registered users of the facial and gesture recognition system 10. The second sub-network output 50 includes confidence levels associated with gestures associated with vehicle control commands.

The CNN 24 includes convolutional neural networks (CNNs) having multiple convolution, pooling and activation layers stacked together with each other. A first set of these layers defines a feature extraction layer (FEL) portion 56 defining the first set of layers directly after and directly receiving the input image 30. The FEL portion 56 conducts a learning operation and thereby learns to represent a first stage of data of the input image 30. The FEL portion 56 includes multiple different stacked layers, wherein the first set of layers (the one directly after and receiving the input image 30) learns to represent data in a very simple form such as horizontal and vertical lines and simple blobs of colors. The following layers of the FEL portion 56 capture more complex shapes such as circles, rectangles, triangles, and the like. The subsequent layers of the FEL portion 56 detect complex combinations of features from the previous layer or layers to form a more meaningful representation such as wheels, faces, grids, and the like. The FEL portion 56 distributes the first stage of data to each of the first sub-network 44 and the second sub-network 48 and the n sub-network 52.

In the first sub-network 44, included with the layers defining the FEL portion 56 is a sub-set of convolution, pooling and activation layers stacked on top of each other defining a first convolution and pooling layer (CPL) portion 58 and a second convolution and pooling layer (CPL) portion 60. The first convolution and pooling layer (CPL) portion 58 receives the first stage of data output from the FEL portion 56 and in a second stage of data captures the more complex shapes more complex shapes including circles, rectangles, triangles, and the like to handle the individual special tasks including object detection, classification, and localization. The third and final grouping of layers defining the second convolution and pooling layer (CPL) portion 60 of the first sub-network 44 then captures a third stage of data defining complex combinations of the features from the FEL portion 56 and the first CPL portion 58 to form a meaningful representation of faces needed to handle the individual special tasks of facial recognition and assignment of confidence levels.

Data from each of the FEL portion 56, including the CPL portion 58 and the CPL portion 60 are merged to generate a fully connected layer 62. Non-maximum suppression of the data of the fully connected layer 62 is used to generate the first sub-network output 46.

The single FEL portion 56 and therefore the tasks performed by the single FEL portion 56 are common to all the CNNs of the first sub-network 44 and the second sub-network 46 (and any additional n sub-networks 52) for the CNN 24 regardless of the final task performed by each individual CNN. Because the initial volume of data analyzed from the input image 30 is greatest, by performing this analysis only once and using the output of the single FEL portion 56 for the input of each of the sub-networks reduces computational time and memory and reduces hardware.

Thus, for example, a CPL portion 64 of the second sub-network 48 also directly receives the first stage of data from the FEL portion 56 in lieu of providing a separate feature extraction layer for the second sub-network 48. A CPL portion 66 of the second sub-network 48 receives the first stage of data from the CPL portion 58. A CPL portion 68 of the second sub-network 48, which includes a 2× deconvolution member 70, receives the output from the CPL portion 60. An output from the 2× deconvolution member 70 and the output from the CPL portion 66 are added and passed through a 2× deconvolution member 72. An output from the 2× deconvolution member 72 and the output from the CPL portion 64 are added and passed through an 8× deconvolution member 74 to generate the second sub-network output 50. An example of the HCNN 24 is described in commonly owned U.S. Provisional Pat. App. No. 62/639,214, filed Mar. 6, 2018, herein incorporated by reference. It should be appreciated that other types of artificial intelligence methods, such as deep learning, may be employed. In addition, multiple CNN's or CNN's in combination with HCNN's may be employed.

Figure 3:
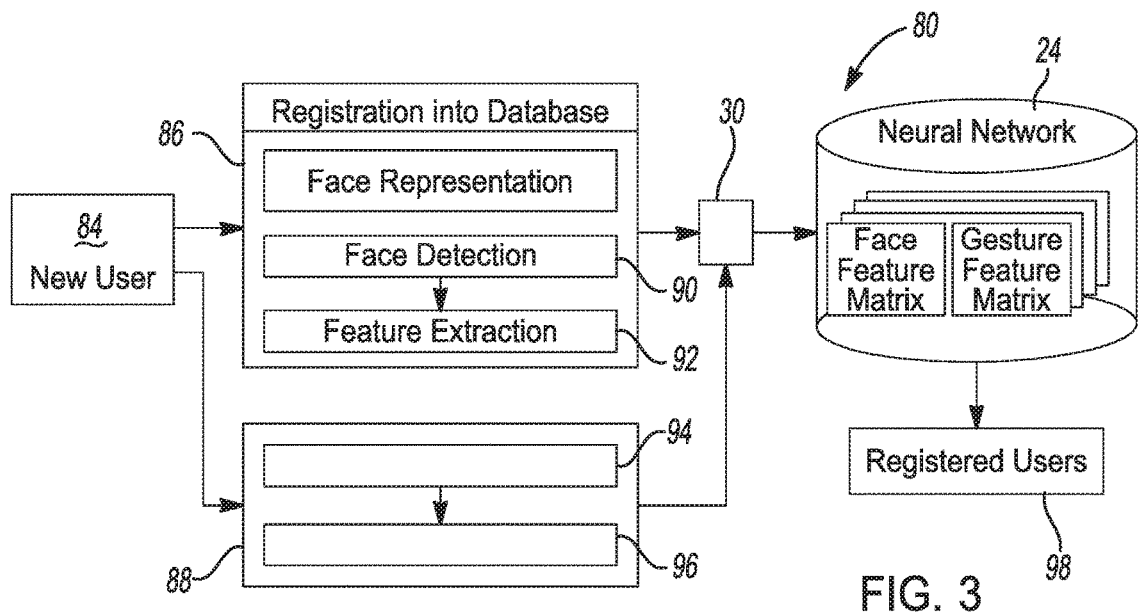
FIG. 3 is a schematic diagram of a registration mode.
Figure 4:
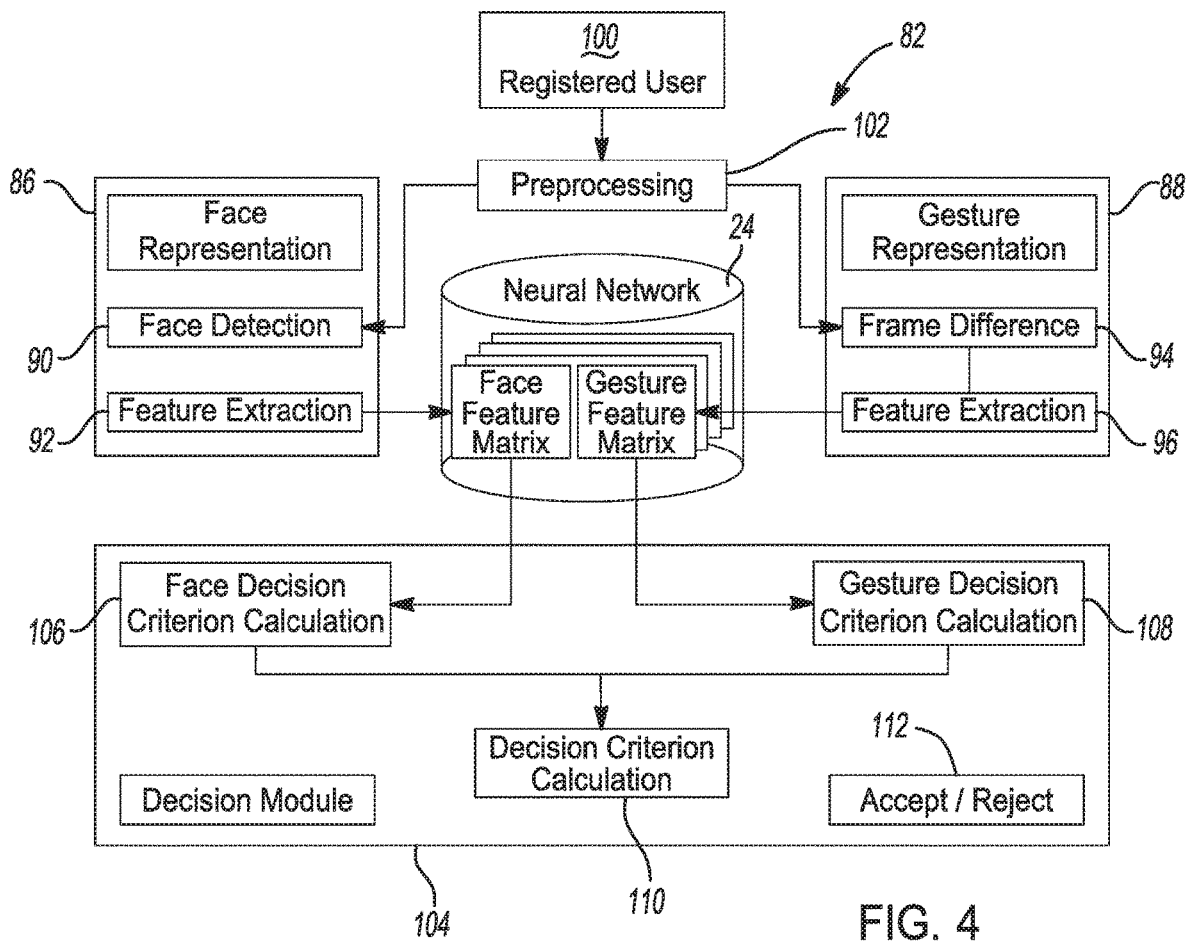
FIG. 4 is a schematic diagram of an authentication mode.

The facial and gesture recognition system 10 generally includes two modes: a registration mode 80, shown as a schematic diagram in FIG. 3, and an authentication mode 82, shown as a schematic diagram in FIG. 4. Each of these modes will be described in greater detail below.

Referring to FIG. 3, the registration mode 80 begins with an image of a new user 84. A new user is one which has not been authenticated by the facial and recognition system 10 or one which has been previously authenticated but subsequently deleted from memory by the facial and recognition system 10. The image of the new user 84 may be taken by one of the sensors 16A-D or by a remote sensor, such as a cell-phone camera, a computer camera, etc. The image of the new user 84 may be used for facial recognition or gesture recognition. For facial recognition, the image of the new user 84 may be one of a series of images of the face at different angles. For gesture recognition, the image of the new user 84 may be one of a series of images of different gestures including hand gestures and head gestures. The image of the new user 84 is fed into a face representation module 86 and/or a gesture recognition module 88.

The face representation module 86 performs face detection 90 and feature extraction 92 on the image of the new user 84. Face detection 90 includes identifying whether the image includes a face. Feature extraction 92 includes identifying and defining points of interest on the face and determining the relationship, such as distance, between the points of interest.

The gesture representation module 88 performs frame difference analysis 94 and feature extraction 96 on the image of the new user 84. Frame difference analysis 94 analyzes differences between multiple images to determine if a gesture is being deployed. Feature extraction 96 includes identifying features of the gesture that characterize the gesture.

The output of the face representation module 86 and/or the gesture representation module 88 is the input image 30 that is fed into the CNN 24. During the registration mode 80, the input image 30 is annotated and associated with the new user. The CNN 24 trains on the input image 30 that is annotated and associated with the new user to generate a registered user profile 98. The registered user profile 98 is stored in memory and used by the CNN 24. The registered user profile 98 includes data associated with the registered user's face and/or gestures.

Turning to FIG. 4, the authentication mode 82 begins with an image of the registered user 100. The image of the registered user 100 is captured by one of the sensors 16A-D. In one aspect, the image of the registered user 100 is captured when a key FOB (not shown) is detected by the motor vehicle 12. The image of the registered user 100 may include a face and/or a gesture. The facial and gesture recognition system 10 then performs preprocessing 102 on the image of the registered user 100. The preprocessing 102 includes cropping the image of the registered user 100. The cropped image of the registered user 100 is then fed into the face representation module 86 and/or the gesture representation module 88. The face representation module 86 performs face extraction 90 and feature extraction 92 before feeding the input image 30 into the CNN 24. The gesture representation module 88 performs frame detection 94 and feature extraction 96 before feeding the input image 30 into the CNN 24.

The CNN 24 uses the input image 30 to determine confidence levels that the image of the registered user 100 is associated with a particular registered user profile 98. The CNN 24 outputs the facial confidence level as the first sub-network output 46. Likewise, the CNN 24 uses the input image 30 to determine confidence levels that the image of the registered user 100 is associated with a particular command gesture. The CNN 24 outputs the gesture confidence level as the second sub-network output 50.

The first sub-network output 46, i.e. the facial confidence level, and the second sub-network output 50, i.e. the gesture confidence level, are each communicated into a decision module 104. The decision module 104 performs a face decision criterion calculation 106 based on the facial confidence level. For example, the face decision criterion calculation 106 compares the facial confidence level to a threshold to determine if the facial confidence level exceeds the threshold. In one example, the threshold is 85%.

The decision module 104 also performs a gesture decision criterion calculation 108 based on the gesture confidence level. For example, the gesture decision criterion calculation 108 compares the gesture confidence level to a threshold to determine if the gesture confidence level exceeds the threshold. In one example, the threshold is 85%.

The decision module 104 then performs a decision criterion calculation 110 to determine if the facial and gesture recognition system 10 should perform an action, i.e., command the motor vehicle 12. The decision criterion calculation 110, in one example, performs an analysis on the output of the face decision criterion calculation 106 and the gesture decision criterion calculation 108. Once complete, the decision module 104 outputs an accept or reject notice 112 that may be used by the controller 14, or other control modules in the motor vehicle 12, to command an action. For example, if accepted, the motor vehicle 12 may unlock, a rear trunk may open upon receipt of a gesture, a side door may open, the engine may start, etc.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for facial and gesture recognition, the method comprising:
capturing an input image with one or more sensors of a facial and gesture recognition system, the sensors disposed on a motor vehicle, or a remote sensor in communication with the motor vehicle;
passing the input image through a convolutional neural network (CNN) of the facial and gesture recognition system, the CNN having at least a first sub-network and a second sub-network distinct from the first sub-network,
utilizing a controller of the facial and gesture recognition system in electronic communication with the sensors, the controller having a processor, a memory, and input/output ports, the memory storing the CNN, and the processor configured to execute the CNN;
performing, with the CNN, a first task of facial recognition with the first sub-network;
performing, with the CNN, a second task of gesture recognition with the second sub-network;
assigning a first confidence level to the facial recognition performed by the first sub-network, and assigning a second confidence level to the gesture recognition performed by the second sub-network;
engaging an authentication mode including:
capturing an image of a registered user with one or more sensors on the motor vehicle or a remote sensor in communication with the motor vehicle, wherein the image of the registered user includes one or more of a face and a gesture;
cropping the image of the registered user and feeding the cropped image of the registered user into a face representation module of the controller and a gesture representation module of the controller;
performing face extraction and feature extraction within the face representation module before feeding the input image into the CNN;
performing frame detection and feature extraction within the gesture representation module before feeding the input image into the CNN;
calculating, within the CNN, facial confidence levels that the image of the registered user is associated with a particular registered user profile;
calculating, within the CNN, gesture confidence levels that the image of the registered user is associated with a particular gesture;
outputting the facial confidence level as an output of the first sub-network;
outputting the gesture confidence level as an output of the second sub-network;
receiving the first sub-network output and the second sub-network output within a decision module;
performing, within the decision module, face decision criterion calculations comparing the facial confidence level to a first threshold to determine if the facial confidence level exceeds the threshold;
performing, within the decision module, gesture decision criterion calculations comparing the gesture confidence level to a second threshold to determine if the gesture confidence level exceeds the second threshold;
performing, within the decision module, a decision criterion calculation to determine whether the facial and gesture system will perform an action, wherein when the facial and gesture confidence levels does not exceed the first and second thresholds, the decision module generates a reject notice and commands the motor vehicle not to perform an action; and
when the facial and gesture confidence levels exceed the first and second thresholds, the decision module outputs an accept notice and commands the motor vehicle to perform an action.

2. The method of claim 1 further comprising:
directly receiving the input image in a feature extraction layer (FEL) portion of the CNN, the CNN having multiple convolution, pooling (CPL), and activation layers stacked together with each other;

conducting, within the FEL portion, a learning operation to learn to represent at least a first stage of data of the input image in a form including horizontal and vertical lines, and blobs of color; and outputting the first stage of data to at least each of the first sub-network and the second sub-network, wherein a first CPL portion directly receives the first stage of data.

3. The method of claim 2 further comprising:

conducting, within the FEL portion, a learning operation to represent at least a second stage of data of the input image in a form including shapes including circles, rectangles, and triangles the input image, wherein a second CPL portion receives the second stage of data.

4. The method of claim 3 further comprising:

detecting, within the FEL portion, complex combinations of features from a previous FEL layer or layers and forming representations in a form including wheels, faces, and grids; and distributing the first stage of data to each of the first sub-network, the second sub-network, and additional sub-networks, wherein the second stage of data captures the circles, rectangles, and triangles, and wherein the second stage of data is used for object detection, classification, and localization.

5. The method of claim 4 further comprising:

conducting, within the FEL portion, a learning operation to learn to represent at least a third stage of data defining complex combinations of features from the FEL portion and the first CPL portion to form representations of faces for use in facial recognition and assignment of confidence levels, and merging data from each of the FEL portion, the first CPL portion, the second CPL portion to generate a fully connected layer, wherein data in the fully connected layer is used to generate an output from the first sub-network.

6. The method of claim 1 further comprising:

engaging a registration mode including:
 capturing an image of a new user with the one or more sensors on the motor vehicle or a remote sensor in communication with the motor vehicle, wherein the new user is a user which has not previously been authenticated, or which has been previously authenticated but deleted from memory;
 utilizing the image of the new user for one or more of facial recognition and gesture recognition;
 wherein for facial recognition, the image includes a series of images of a face of the new user taken at different angles, and the image is fed into the face representation module of the controller; and
 wherein for gesture recognition, the image includes a series of images of different gestures including hand gestures and head gestures, and the image is fed into the gesture representation module of the controller.

7. The method of claim 6 further comprising:

performing face detection and feature extraction on the image of the new user, including:
 identifying whether the image includes a face;
 identifying and defining points of interest on the face; and
 determining a spatial relationship between the points of interest.

8. The method of claim 7 further comprising:

performing frame difference analysis and feature extraction on the image of the new user for gesture extraction, the frame difference analysis and feature extraction including:
 analyzing differences between multiple images to determine if a gesture is being deployed; and
 identifying features of the gesture that characterize the gesture.

9. The method of claim 6 further comprising:

feeding output of the face representation module and the gesture representation module into the CNN as the input image for the CNN, wherein during registration mode the input image is annotated and associated with the new user;

training the CNN with the input image that is annotated and associated with the new user; and generating a registered user profile based on the input image that is annotated and associated with the new user, wherein the user profile includes data associated with the user's face and gestures.

10. A system for facial and gesture recognition, the system comprising:

one or more sensors, the one or more sensors disposed on a motor vehicle or a remote sensor in communication with the motor vehicle, the one or more sensors capturing an input image;

a controller having a processor, a memory, and input/output ports, the input/output ports in electronic communication with the one or more sensors and receiving the input image, the memory storing a convolutional neural network (CNN), the controller passing the input image through the CNN, the CNN having at least a first sub-network and a second sub-network distinct from the first sub-network;

the first sub-network of the CNN performing a first task of facial recognition;

the second sub-network of the CNN performing a second task of gesture recognition;

the CNN assigning a first confidence level to the facial recognition performed by the first sub-network, and the CNN assigning a second confidence level to the gesture recognition performed by the second sub-network, the CNN further including a feature extraction layer (FEL) portion, and multiple convolution, pooling (CPL) and activation layers stacked together with each other, wherein the FEL portion conducts a learning operation to learn to represent at least a first stage of data of the input image in a form including horizontal and vertical lines, and blobs of color and outputs the first stage of data to at least each of the first sub-network and the second sub-network, wherein a first CPL portion directly receives the first stage of data;

wherein the one or more sensors on the motor vehicle or a remote sensor in communication with the motor vehicle captures an image of a registered user, wherein the image of the registered user includes one or more of a face and a gesture;

the system crops the image of the registered user and feeds the cropped image of the registered user into a face representation module of the controller and a gesture representation module of the controller;

the system performs face extraction and feature extraction within the face representation module before feeding the input image into the CNN;

the system performs frame detection and feature extraction within the gesture representation module before feeding the input image into the CNN;

wherein the CNN calculates facial confidence levels that the image of the registered user is associated with a particular registered user profile;

the CNN calculates gesture confidence levels that the image of the registered user is associated with a particular gesture;

wherein the facial confidence level is an output of the first sub-network, and the gesture confidence level is an output of the second sub-network;

a decision module receives the first sub-network output and the second sub-network output;

the decision module performs face decision criterion calculations comparing the facial confidence level to a first threshold to determine if the facial confidence level exceeds the first threshold; gesture decision criterion calculations comparing the gesture confidence level to a second threshold to determine if the gesture confidence level exceeds the second threshold; a decision criterion calculation to determine whether the facial and gesture system will perform an action, wherein when the facial and gesture confidence levels does not exceed the first and second thresholds, the decision module generates a reject notice and commands the motor vehicle not to perform an action; and when the facial and gesture confidence levels exceed the first and second thresholds, the decision module outputs an accept notice and commands the motor vehicle to perform an action.

11. The system of claim 10, wherein the FEL portion conducts a learning operation to learn to:

represent at least a second stage of data of the input image in a form including shapes including circles, rectangles, and triangles the input image, wherein a second CPL portion receives the second stage of data the FEL portion detects complex combinations of features from a previous FEL layer or layers and forms representations including wheels, faces, and grids;

distribute the first stage of data to each of the first sub-network, the second sub-network, and additional sub-networks, wherein the second stage of data captures the circles, rectangles, and triangles, and wherein the second stage of data is used for object detection, classification, and localization; and represent at least a third stage of data defining complex combinations of features from the FEL portion and the first CPL portion to form representations of faces for use in facial recognition and assignment of confidence levels.

12. The system of claim 11 wherein the CNN merges data from each of the FEL portion, the first CPL portion, the second CPL portion to generate a fully connected layer, wherein data in the fully connected layer is used to generate an output from the first sub-network.

13. The system of claim 10 further including a registration mode wherein:

the one or more sensors on the motor vehicle or a remote sensor in communication with the motor vehicle captures an image of a new user, wherein the new user is a user which has not previously been authenticated, or which has been previously authenticated but deleted from memory, the image of the new user is used for one or more of facial recognition and gesture recognition, wherein for facial recognition, the image includes a series of images of a face of the new user taken at different angles, and the image is fed into the face representation module of the controller, and for gesture recognition, the image includes a series of images of different gestures including hand gestures and head gestures, and the image is fed into the gesture representation module of the controller.

14. The system of claim 13 wherein:

the CNN performs face detection and feature extraction on the image of the new user, including:

identifying whether the image includes a face;

identifying and defining points of interest on the face; and determining a spatial relationship between the points of interest.

15. The system of claim 14 wherein:

the CNN performs frame difference analysis and feature extraction on the image of the new user for gesture extraction, the frame difference analysis and feature extraction including:

analyzing differences between multiple images to determine if a gesture is being deployed; and identifying features of the gesture that characterize the gesture.

16. The system of claim 13 wherein:

the output of the face representation module and the gesture representation module is fed into the CNN as the input image for the CNN, wherein during registration mode the input image is annotated and associated with the new user;

the CNN is trained with the input image that is annotated and associated with the new user; and a registered user profile is generated by the CNN based on the input image that is annotated and associated with the new user, wherein the user profile includes data associated with the user's face and gestures.

* * * * *